March 29, 1966 R. F. GIORDANO 3,242,786
SHEARING MACHINE
Filed Jan. 10, 1963 3 Sheets-Sheet 1
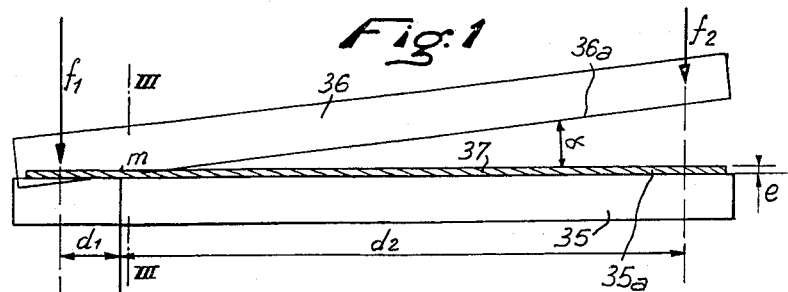
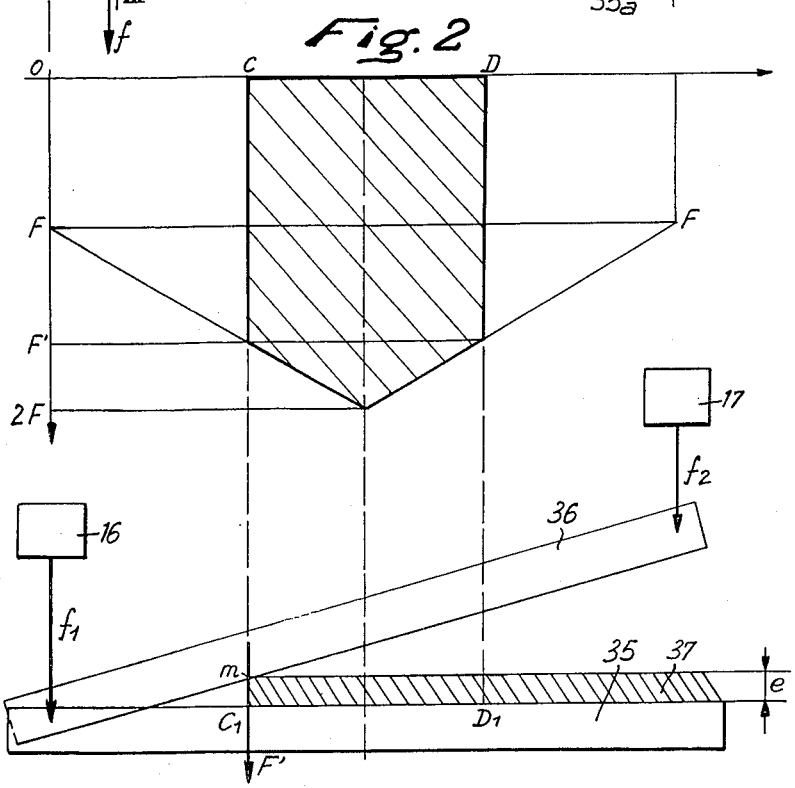
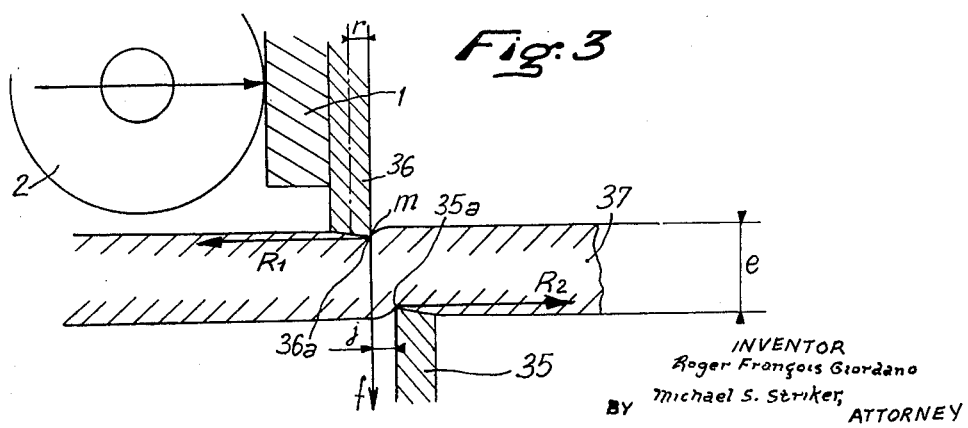
INVENTOR
Roger François Giordano
BY Michael S. Striker,
ATTORNEY

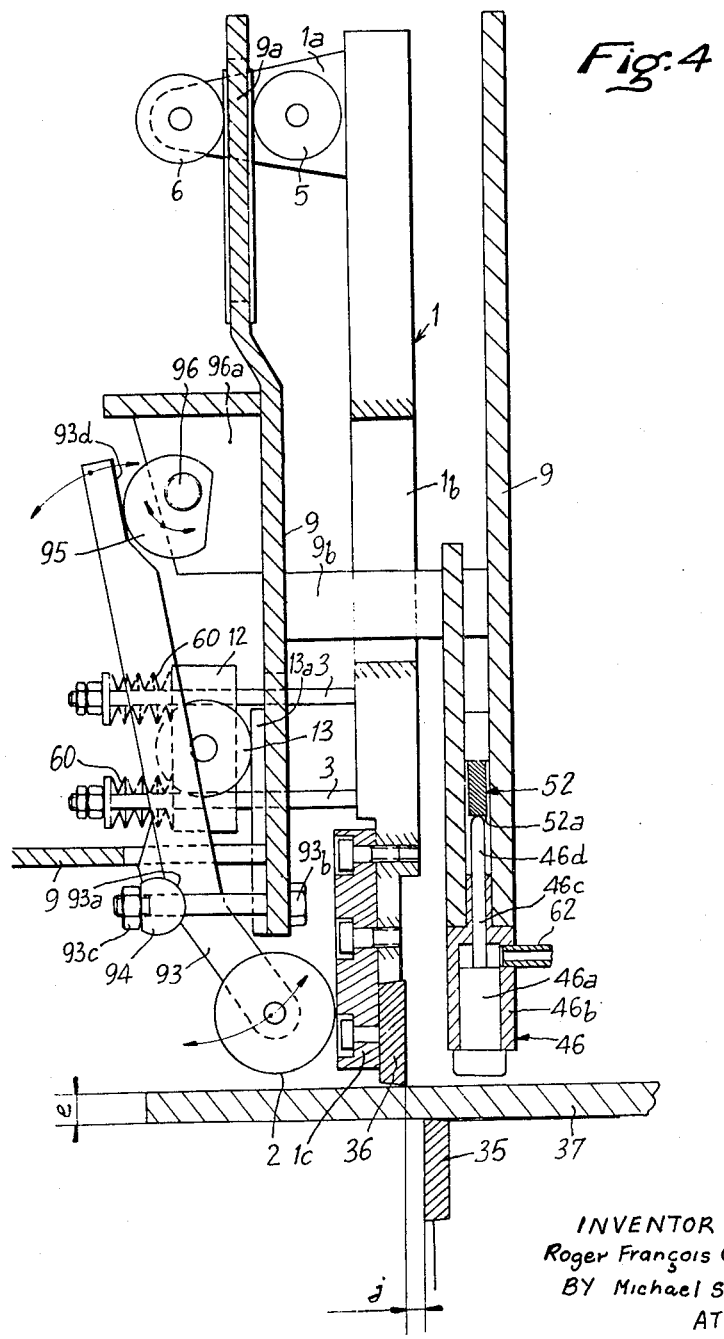

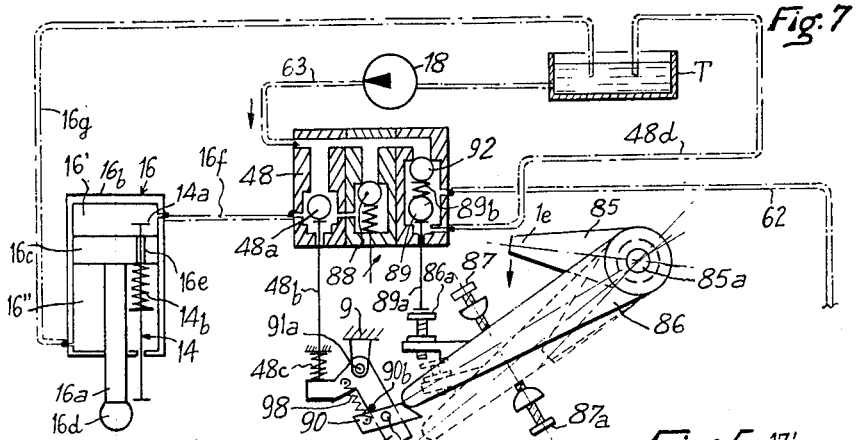
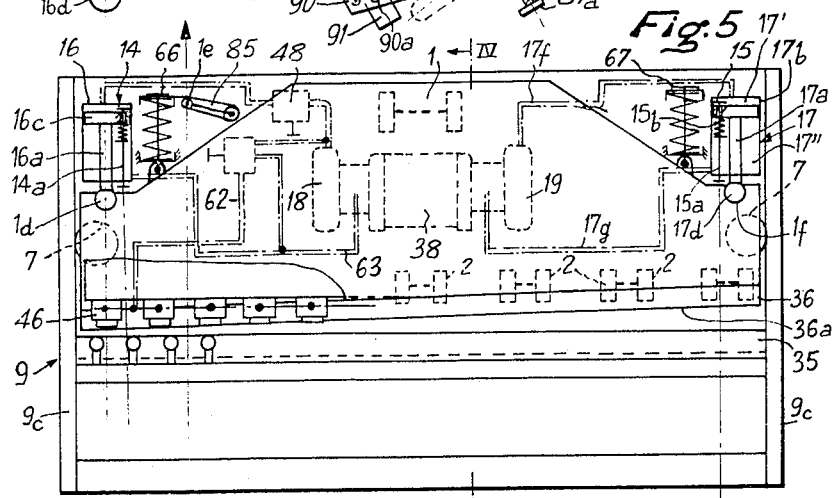
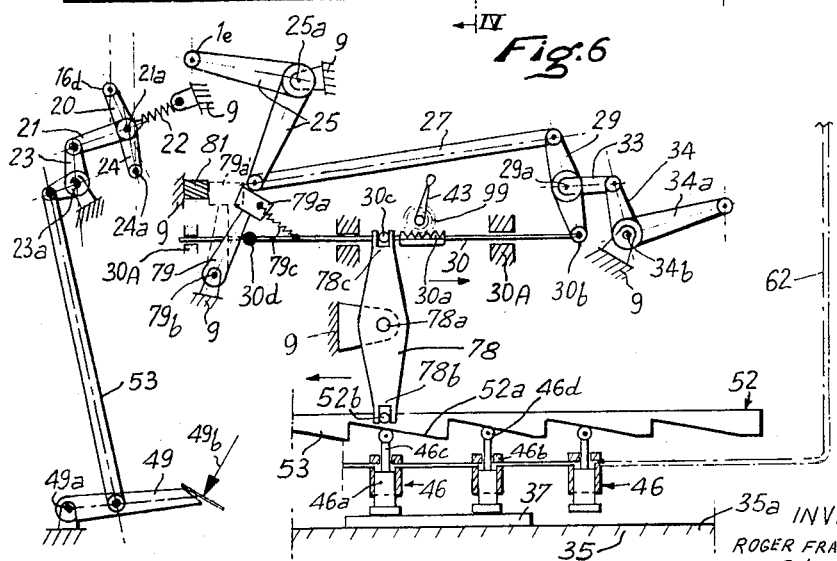

United States Patent Office 3,242,786
Patented Mar. 29, 1966

3,242,786
SHEARING MACHINE
Roger François Giordano, 2 Rue Pasteur A,
Deuil-la-Barre, France
Filed Jan. 10, 1963, Ser. No. 250,631
Claims priority, application France, Jan. 19, 1962,
885,299
15 Claims. (Cl. 83—380)

The present invention relates to shearing machines in general, and more particularly to shearing machines of the type known as open frame shears wherein a movable blade is reciprocable toward and away from and is inclined with respect to a fixed blade. In such machines, the movable blade is normally reciprocated by hydraulic means which produce the shearing force necessary to cut through a workpiece which is inserted into the space between the blades.

It is an important object of my invention to provide a shearing machine wherein the forces applied by a plurality of hydraulic jacks or by other force applying devices may be added to produce a substantial shearing force which is sufficient for shearing of comparatively thick and hard-to-cut workpieces.

Another object of the invention is to provide an improved holding device to resist reaction forces which develop in the course of a shearing cycle and which act upon the moving blade in a direction to move it laterally of and away from the fixed blade so as to increase the width of the gap between such blades.

A further object of the invention is to provide a machine of the above outlined characteristics wherein the holding device may be readily adjusted to permit removal of workpieces which are jammed between the blades and wherein such adjustments of the holding device are possible without necessitating complete or even partial dismantling of the machine.

An additional object of the instant invention is to provide a shearing machine of the type known as open frame shears wherein the angle of inclination between the fixed blade and the movable blade may be adjusted in a very simple manner without necessitating even partial dismantling of the machine, and wherein such angle may be adjusted simultaneously with the width of the space for a workpiece so that a careless operator is automatically prevented from inserting into the machine a workpiece of excessive width.

Still another object of the invention is to provide a shearing machine wherein the strokes of the force applying devices, the inclination of the movable blade, and the width of the space for accommodation of a given workpiece may be adjusted simultaneously by a single actuating mechanism.

A further object of the invention is to provide a shearing machine of the above outlined characteristics which embodies a novel hold-down mechanism for the workpiece and wherein such hold-down mechanism may be adjusted simultaneously with and by the same adjusting means as the remaining adjustable component parts of the machine.

A concomitant object of the invention is to provide a shearing machine wherein the pressure which the hold-down mechanism exerts upon the workpiece may be readily adjusted to prevent scratching or marking of the workpiece and wherein such hold-down mechanism is operated in synchronism with the force applying devices to insure that the workpiece is automatically gripped during the shearing cycle and that the workpiece is automatically released upon completion of the cycle.

An additional object of the invention is to provide a shearing machine wherein the movable blade is automatically returned to idle position as soon as the shearing cycle is completed and wherein a single prime mover may be used to actuate all of the force applying devices and to thereby supply the power necessary for cutting through the workpiece.

A further object of the invention is to provide a shearing machine of the above outlined characteristics wherein the movable blade is mounted in a novel way to permit movements of such blade toward and away from as well as laterally of the fixed blade, and wherein the movable blade is controlled by a novel system of guide means which requires little attention (particularly lubrication) and which is much lighter than all such conventional guide means of which I have knowledge at this time.

With the above objects in view, the invention resides in the provision of a shearing machine of the type known as open frame shears which comprises a fixed blade, a second blade having two spaced end portions and being movable toward and away from the fixed blade so that a cut may be formed in a workpiece which is placed between the blades when the second blade is caused to move toward the fixed blade, and means for moving the second blade toward the fixed blade. In accordance with my invention, such moving means comprises a first and a second force applying device (each of which preferably assumes the form of a hydraulic jack) each operatively connected to one end portion of the second blade, and separate force generating means (preferably in the form of fluid pressure generating pumps) for the force applying devices so that the force applied to the second blade by one of such devices is added to the force which is applied to the second blade by the other device.

Certain other features of my invention reside in the provision of a specially constructed hold-down mechanism for the workpiece which engages the workpiece during a shearing cycle and which preferably comprises a series of hydraulic rams receiving pressure fluid from one of the pumps, in the provision of special holding means to resist reaction forces to which the second blade is subjected during a shearing cycle and which tend to move the second blade laterally of and away from the fixed blade, in the provision of specially constructed adjusting means which is used to change the inclination of the second blade with respect to the fixed blade and which may simultaneously adjust the strokes of rams in the hold-down mechanism, in the provision of novel means for guiding the second blade with respect to the fixed blade, and in the provision of novel adjusting means for the holding means to permit rapid removal of a jammed workpiece by changing the width of the gap between the cutting edges of the blades.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a schematic front elevational view of two blades constituting component parts of a shearing machine of the type known as open frame shears which embodies my invention;

FIG. 2 is a similar front elevational view of the blades, showing one of the blades in a different position of inclination and further showing the means for moving the one blade with respect to the other blade together with a diagram of cutting or shearing stresses to which a workpiece is subjected when the shearing machine is in actual use;

FIG. 3 is an enlarged transverse section as seen in the direction of arrows from the line III—III of FIG. 1;

FIG. 4 is an enlarged transverse vertical section through the shearing machine substantially as seen in the direction of arrows from the line IV—IV of FIG. 5 but with certain parts omitted, showing a holding device for resisting the reaction forces to which the movable blade is subjected in the course of a cutting or shearing operation;

FIG. 5 is a diagrammatic front elevational view of the entire shearing machine;

FIG. 6 is a diagrammatic view of the arrangement which actuates the means for moving one of the blades with respect to the other blade; and FIG. 7 is an enlarged fragmentary partly elevational and partly sectional view of the structure shown in FIG. 5.

Referring now in greater detail to the drawings, and first to FIG. 1, there is shown a portion of a shearing machine including a fixed knife or blade 35 having an elongated cutting edge 35a, and a movable knife or blade 36 whose elongated cutting edge 36a is inclined with respect to the cutting edge 35a through an angle $\alpha$. The workpiece 37 to be sheared has a thickness $e$ and the mounting of the blade 36 is such that the shearing point $m$ travels along the cutting edges 35a, 36a in a direction from the left to the right, as viewed in FIG. 1.

The means for moving the blade 35 toward the blade 35 comprises two hydraulic force applying devices 16, 17 (see FIG. 2) each of which acts upon one end portion of the blade 36 and which respectively transmit to this blade forces $f_1$ and $f_2$. These pressure generating devices assume the form of fluid-operated cylinder and piston assemblies, hereinafter called jacks. As will be explained in greater detail in connection with FIGS. 5 to 7, each of these jacks is operated by a separate fluid pressure generating pump (18, 19) and such pumps are preferably driven by a common prime mover, such as an electric motor 38.

Cutting or shearing stresses developing when the blade 36 is moved against the workpiece 37 are a function of the angle $\alpha$ and of the thickness $e$ of the workpiece. If the workpiece is a plate or sheet of constant thickness, if the quality of the material of the workpiece is the same in all zones thereof, and if the blade 36 is moved in substantial parallelism with itself so that the angle $\alpha$ remains unchanged, the shearing stresses remain constant and the point at which such shearing stresses act upon the workpiece travels along the cutting edge 36a from the one to the other end of the cutting zone, i.e., from the left to the right as view in FIG. 1 or 2. If the total shearing force in the shearing point $m$ is $f$, then $$f = f_1 + f_2$$

wherein $f_1$ and $f_2$ are forces applied to the blade 36 by the jacks 16, 17, respectively. The magnitude of the forces $f_1$ and $f_2$ varies between zero and $f$, depending on the momentary position of the shearing point $m$ with respect to the points where the jacks 16, 17 act upon the blade 36. It can also be said that $$\frac{f_1}{f_2} = \frac{d_2}{d_1}$$

wherein $d_1$ and $d_2$ respectively represent the distance between the shearing point $m$ and the points at which the jacks 16, 17 act upon the blade 36, see FIG. 1.

The above equations are valid for all types of open frame shears wherein a movable blade is acted upon by a pair of jacks, i.e., irrespective of the manner in which pressure fluid is being fed to the jacks. However, by utilizing separate pumps for the jacks 16, 17, the shearing machine of my invention exhibits the following important advantages:

(a) Very satisfactory distribution of forces $f_1$ and $f_2$ with respect to the shearing point $m$.

(b) Under certain circumstances, the total shearing force $f$ may equal the sum of forces $f_1$ and $f_2$ so that such total shearing force may exceed by 100 percent forces produced in conventional open frame shears of which I am aware at this time. Consequently, my machine may be constructed in such a way that the cutting power is concentrated in the central zone of the machine and that the cutting power is twice the power of a single jack if the power applied by the jack 16 equals that applied by the jack 17 and if the motor 38 is powerful enough to supply such power to the pumps 18, 19.

(c) Easy adjustment of the angle $\alpha$ to vary the capacity of the machine and to reduce the wear on its parts. Thus, the shearing angle $\alpha$ will be increased for cutting of thicker workpieces and this angle will be reduced if the workpieces are comparatively thin so as to reduce the strain on such thin workpieces.

The diagram of cutting or shearing stresses which is shown in FIG. 2 is illustrative of loads upon the jacks 16, 17 in the course of a shearing operation. If F is the nominal power of each jack, the machine will work with such power F along the full length of the cutting edge 36a (i.e., between the points at which the jacks apply shearing force to the blade 36). In addition, and under ideal circumstances, the machine will transmit a power 2F when the shearing point $m$ is located midway between the end portions of the blade 36. In actual operation, the machine will normally produce a power F' which is slightly less than 2F, and such power F' will be applied to the blade 36 along a central cutting zone extending between the lines C–C$_1$ and D–D$_1$. Thus, the machine may be used for shearing of very thick workpieces whose length exceeds substantially the distance C–D or C$_1$–D$_1$. Such workpieces are cut in a series of consecutive steps by advancing them stepwise in a direction from the right to the left, as viewed in FIG. 2, the length of each step being equal to or being less than the distance C–D. For example, the length of the actual cutting zone C$_1$–D$_1$ may equal one-third of the overall length of the cutting edge 36a. In the embodiment of FIG. 2, the actual power F' which the jacks 16, 17 apply to the blade 36 in the cutting zone C$_1$–D$_1$ equals 5F/3.

In order to more accurately define the starting point (C$_1$) of the cutting or shearing zone C$_1$–D$_1$ the cutting edge 36a of the blade 36 overlaps or intersects the cutting edge 35a at the top of the shear stroke. This is shown in the left-hand portion of FIG. 2 wherein the length of the crossing or overlap equals the length of the cutting zone.

Referring to FIG. 3, it will be seen that the cutting edges 35a, 36a are respectively subjected to reaction forces R$_2$, R$_1$ which act in directions parallel with the plane of the workpiece 37 and which tend to increase the width of the gap $j$ between the cutting edges. Such forces R$_1$ and R$_2$ travel with the point $m$ along the full length of the zone C$_1$–D$_1$ and their magnitude is sufficient to warrant the provision of special holding devices which prevent movements of the blade 36 in a direction laterally of, away from, and at right angles to the longitudinal extension of the cutting zone, i.e., such devices tend to prevent widening of the gap $j$.

The force R$_2$ acting upon the fixed blade 35 is taken up directly by the frame 9 of the shearing machine. The frame 9 also takes up the reaction force R$_1$ but, since the blade 36 is movable with respect to the frame, the machine of my invention embodies a novel holding device which is shown in FIG. 4 and which normally prevents widening of the gap $j$ by resisting the reaction force R$_1$. The blade 36 is mounted on a support or apron 1 which is reciprocable by the jacks 16, 17, and the aforementioned holding device cooperates with the apron 1 to thereby retain the blade 36 against movement in a direction to the left, as viewed in FIG. 3 or 4, namely, laterally of and away from the fixed blade 35.

Prior to proceeding with the description of FIG. 4, I will now outline certain conventional methods of counteracting the reaction forces to which the movable blade of open frame shears is subjected in actual use. As a rule, the apron of the movable blade is restricted to movements between parallel guide bars which must be machined with great precision and which require constant lubrication. In addition, conventional aprons are rather bulky to make sure that they will resist the reaction force $R_1$ without undue strain and that they may transmit such force to the guide bars. Since the guide bars are rigidly fixed to the frames of conventional open frame shears, such shears cannot be adjusted when a workpiece jams between the blades and when such a workpiece can be removed only upon widening of the gap between the cutting edges.

In accordance with one feature of my invention, the holding device for the apron 1 is constructed and assembled in such a way that, while it is capable of resisting the reaction force $R_1$, it may permit movements of the apron 1 laterally of and away from the cutting edge 35a and resultant widening of the gap j in a very simple and time-saving manner so that a jammed workpiece may be removed from the machine with little loss in time and without necessitating even partial dismantling of the movable blade 36.

As illustrated in FIGS. 3, 4 and 5, the holding device comprises a series of pairwise arranged holding members here shown as presser rollers 2 which are biased against the left-hand side of the apron 1, as viewed in FIG. 4, and which are located in close proximity of the cutting edge 36a of the blade 36 so as to prevent undue bending of the apron. The presser rollers 2 are distributed along the entire length of the cutting edge 36a and are mounted in pairs on two-armed levers 93 (only one shown in FIG. 4) each of which is formed with a socket 93a receiving a portion of a horizontal rod 94 serving as a pivot for the levers 93 and fixed to the frame 9 by bolts and nuts 93b, 93c. The longer arms of the levers 93 are formed with cam faces 93d which engage turnable plate cams 95 mounted on a cam shaft 96. This shaft is turnable manually by means of a suitable handwheel or the like so that the levers 93 may be rocked about the rod 94 to move the blade 36 nearer to or to permit this blade to move laterally of and further away from the blade 35, i.e., to change the width of the gap j. It will be noted that the cam shaft 96 is mounted in bearing brackets 96a (only one shown in FIG. 4) which are secured to or which are integral with the frame 9. The levers 93, the cams 95 and the shaft 96 together constitute an adjusting means for the presser rollers 2 by moving these rollers toward the retaining portion 1c.

The machine further comprises resilient means for biasing the support or apron 1 against the presser rollers 2. This resilient biasing means comprises packages of dished springs 60 on bolts 3 which are fixed to the apron 1. The springs bear against a crosshead 12 which carries rollers 13 which in turn engage rails 13a on the frame 9 whereby the apron 1 (and more particularly a plate-like retaining portion 1c which is fixed to or integral with the lower end portion of the apron and which is connected with the blade 36) is permanently biased against the rollers 2. The bolts 3 extend through suitable cutouts in the frame 9 so that the apron 1 is reciprocable toward and away from the blade 35, i.e., vertically as viewed in FIG. 4.

In addition to being biased against the presser rollers 2 which thus serve as a guide means for the blade 36 when the latter is moved by the jacks 16, 17, the shearing machine comprises additional guide means for the upper portion of the apron, and such additional guide means may assume the form of rollers 5, 6 (shown in the upper part of FIG. 4) which are mounted on a bracket 1a of the apron and which engage the opposite faces of a two-faced frame member 9a forming part of the frame 9. This frame member 9a may be provided with suitable channels or ways which receive portions of the rollers 5, 6 to insure that the apron 1 moves in a predetermined path when it is acted upon by the jacks 16, 17 to move the blade 36 toward the blade 35. In addition, the apron 1 is formed with an elongated slot 1b which receives a guide rib 9b of the frame 9 and which cooperates with the rollers 5, 6, with the frame member 9a and with the presser rollers 2 to retain the apron in a predetermined plane.

FIG. 5 shows that the apron 1 is held against excessive displacements in the longitudinal direction of the blades 35, 36. The means for limiting or controlling such longitudinal displacements assumes the form of rollers 7 which travel along vertical rails 9c forming part of or rigid with the frame 9. The rails 9c are substantially perpendicular to the longitudinal extension of the fixed blade 35. Thus, the apron is restricted to movements in a vertical plane (in response to operation of the jacks 16, 17), and its lower portion may also be swung away from the blade 35 in response to turning of the cam shaft 96 in order to change the width of the gap j. The width of this gap is normally about one-tenth of the thickness e of a workpiece 37.

The range of the adjusting means 95, 96 for the gap j is sufficient to insure that a workpiece which is jammed between the cutting edges 35a, 36a may be readily removed from the shearing machine without necessitating dismantling of any of the component parts. Thus, all an operator has to do is to turn the cam shaft 96 to such an extent that the width of the gap j increases to a magnitude which is sufficient to permit withdrawal of the workpiece. The operator then returns the shaft 96 to its original angular position and thereby reduces the width of the gap so that the machine is ready for the next shearing operation.

The advantages of the presser rollers 2, of the aforedescribed guide means for the apron 1, and of the gap adjusting means 95, 96 may be summarized as follows:

The reaction force $R_1$ is taken up in close proximity of the cutting edge 36a so that the blade 36 or the apron 1 is not subjected to undesirable bending stresses. Consequently, the cutting edge 36a may be guided with greater accuracy because its deflection from the desired line of movement is negligible or equals zero.

The width of the gap j may be adjusted without necessitating dismantling of the blade 36 or of the apron 1 so that an improperly cut workpiece or a workpiece which has been caught in the shearing machine may be removed with little loss in time and without necessitating substantial effort for such removal.

The presser rollers 2 which counteract the tendency of the blade 36 to yield to the reaction force $R_1$ require much less lubrication than the aforementioned guide bars of conventional shearing machines, and the wear on such rollers is negligible.

Referring to FIGS. 5 to 7, downward movements of the apron 1 and of the movable blade 36 are controlled by a pair of pilot valves 14, 15 which are respectively mounted in the pistons 16c, 17c of the jacks 16, 17. As illustrated in FIG. 5, these pilot valves comprise spring-biased valve members or valve rods 14a, 15a which normally tend to seal the passages in the pistons 16c, 17c so that the lower cylinder chambers are sealed from the upper cylinder chambers. Since the jacks 16, 17 are of identical construction, it suffices to describe in greater detail the jack 16 which is shown on a larger scale in the left-hand portion of FIG. 7. This jack comprises the aforementioned piston 16c which is connected to the piston rod 16a, the latter having at its lower end a ball 16d which fits into a socket 1d in the apron 1 so that the apron is compelled to share all axial movements of the piston but is free to be tilted or to be displaced radially with respect to the ball 16d. The piston 16c is received in a cylinder 16b which is fixed to the frame 9 at a level above the upper edge of the apron 1. The passage 16e in the piston 16c receives a portion of the valve member 14a, and the lower end portion of this valve member extends through the bottom wall of the cylinder 16b so that it may be engaged by a link train in a manner to be described in connection with FIG. 6. The valve member 14a normally seals the upper cylinder chamber 16' from the lower cylinder chamber 16'', and the chamber 16' communicates with a supply conduit 16f which admits pressure fluid when the apron 1 should descend toward the fixed blade 35. The lower cylinder chamber 16'' communicates with a return conduit 16g which conveys spent fluid to a source here shown as a tank T from which the pumps 18, 19 draw fluid to feed it to the jacks 16, 17.

The link train which reciprocates the valve member 14a against the bias of a pilot valve spring 14b is movable by an operator-controlled pedal or treadle 49, shown in FIG. 6, which may be pivoted about a fixed pin 49a by the foot of an operator who applies pressure in the direction indicated by an arrow 49b. This link train comprises an elongated link 53 which is pivoted to a median portion of the pedal 49 and whose upper end is articulately connected to one arm of a bell crank lever 23 which pivots about a fixed pin 23a and whose other arm is articulately connected to one end of a short link 21 whose other end is connected with a pivot pin 21a for a pair of arms 20, 24. The arm 20 is articulately coupled to the head 16d of the piston rod 16a, and the free terminal 24a of the arm 24 is articulately coupled to the lower end portion of the valve member 14a. The pin 21a is connected to one end of a helical spring 22 whose other end is fixed to the frame 9. The bias of the spring 22 is selected in such a way that, when the pedal 49 is not depressed, the arms 20, 24 make an angle inferior to 180° and the arm 24 holds the valve member 14a in open position so that pressure fluid admitted to the upper cylinder chamber 16' through the supply conduit 16f may flow through the passage 14b, through the lower cylinder chamber 16'', through the return conduit 16g and back to the tank T. Consequently, the piston 16c is free to return to the position of FIG. 5 or 7 under the bias of a return spring 66 which operates between the apron 1 and the frame 9 and which tends to maintain the apron (and hence the movable blade 36) in lifted position at a point above the fixed blade 35. However, when the operator steps on the pedal 49, the link train 53, 23, 21, 24 causes the terminal 24a to move away from the valve member 14a whereby the spring 14b closes the passage 16e and the pressure fluid admitted to the upper cylinder chamber 16' causes the piston 16c to descend and to push the apron 1 toward the fixed blade 35. The pressure fluid admitted to the upper chamber 16' produces the aforementioned force F which is transmitted to the left-hand end portion of the movable blade 36, as viewed in FIG. 5, so that the cutting edge 36a is compelled to penetrate into the material of the workpiece which is placed onto the fixed blade 35.

I will now describe the operative connection between the valve members 14a, 15a which constitutes a transmission and which causes the jack 17 to become operative in response to operation of the jack 16, i.e., which causes the two jacks to simultaneously apply to the apron 1 a downwardly directed force F' and to thereby compel both end portions of the blade 36 to move toward the fixed blade 35. A stud 1e on the apron 1 is articulately connected to one arm of a bell crank lever 25 which is pivotable about a pin 25a carried by the frame 9. The other arm of the lever 25 is articulately connected to an elongated link 27 which in turn transmits motion to one arm of a two-armed lever 29 which is pivotable about a pin 29a connecting it to a short link 33. The link 33 is connected to one arm of a bell crank lever 34 which is pivoted to the frame 9 by a pin 34b and whose other arm 34a abuts against the lower end portion of the valve member 15a. Thus, when the jack 16 causes the apron 1 to descend, the stud 1e transmits motion to the transmission including the link train 25, 27, 29, 33, 34 and the latter permits the valve spring 15b to close the pilot valve 15 so that pressure fluid introduced into the upper cylinder chamber 17' of the cylinder 17b through a supply conduit 17f cannot flow to the lower cylinder chamber 17'' and through the return conduit 17g back to the tank T. Consequently, the pressure fluid is entrapped in the chamber 17' and the piston 17c is compelled to descend and to transmit motion to the apron through the head 17d of the piston rod 17a. The head 17d is received in a socket 1f of the apron 1. The supply conduit 17f receives pressure fluid from the pressure side of the pump 19. A return spring 67 operates between the right-hand portion of the apron 1 and the upper part of the frame 9; this spring cooperates with the aforementioned spring 66 to return the apron to the raised position of FIG. 5 as soon as the pilot valves 14, 15 open in response to release of the pedal 49.

The idle position of the bell crank lever 34 and hence the exact time at which the pilot valve 15 closes may be regulated by means of a connecting rod 30 whose right-hand end portion 30b (as viewed in FIG. 6) is articulately connected to the lower arm of the lever 29. The rod 30 is guided in slide bearings 30A of the frame 9.

The rod 30 carries a toothed rack 30a whose teeth mate with the teeth of a pinion 99 turnable by means of a handle 43 so that an operator may shift the rod 30 axially and will thereby change the inclination of the lever 29 together with the angular position of the bell crank 34. Consequently, the rod 30 and the handle 43 serve as a means for adjusting the transmission between the valves 14, 15 so that one of the valves, 15, may trail the movement of the other valve when the other valve moves to its closed position. In other words, merely by adjusting the axial position of the rod 30, the operator may change the exact time at which the valve 15 closes in response to descent of the apron 1. Thus, the rod 30 simultaneously serves to adjust the magnitude of the angle $\alpha$ because, if the jack 17 is permitted to trail behind the jack 16, the left-hand end portion of the blade 36 will descend through a predetermined distance before the jack 17 causes the right-hand portion of this blade to follow such downward movement. The rollers 7 are mounted in a way to permit such movements of the apron 1 and of the blade 36.

The spring 22 returns the operator-controlled pedal 49 to the idle position of FIG. 6 and opens the pilot valves 14, 15 as soon as the pedal is released. The springs 66, 67 then take over and return the apron 1 to the raised position of FIG. 5. The pilot valve 14 opens immediately when the arm 24 returns to the position of FIG. 6, and the other valve 15 opens in response to upward movement of the apron whose stud 1e transmits motion to the link train 25, 27, 29, 33, 34 in a sense to insure that the valve member 15a is lifted against the bias of its spring 15b. As shown in FIG. 5, the strokes of the pistons 16c, 17c need not be too long so that little time is required for moving the apron 1 to its raised or lowered position.

In accordance with a further feature of my invention, the shearing machine comprises a specially constructed hold-down mechanism which engages the workpiece during the shearing cycle. This hold-down mechanism includes a series of hydraulic cylinder and piston assemblies 46, hereinafter called rams, each of which comprises a plunger 46a received in a cylinder 46b and having a rod 46c whose upper end carries a roller follower 46d abutting against the face 52a of a specially constructed reciprocable toothed cam 52 which is mounted in the frame 9 in such a way that it may move back and forth in parallelism with the cutting edges 35a, 36a. The followers 46d abut against the respective sections of the stepped or serrated cam face 52a when the hold-down mechanism is in idle position, i.e., the cam 52 limits the upward strokes of the plungers 46a and thereby determines the width of the space which accommodates the workpiece 37. In order to insure that the cam 52 is adjusted in response to changes in the angle $\alpha$, it carries a pin 52b received in the bifurcated lower end portion of a rocker 78 which pivots about a pin 78a secured to the frame 9 and whose bifurcated upper end portion 78c receives a motion transmitting pin 30c on the rod 30. Thus, when the rod 30 changes its axial position, it changes the angular position of the rocker 78 and the latter adjusts the cam 52 in such a way that the stroke of the plungers 46a increases if the angle α increases or vice versa. Since the magnitude of the angle α should reflect the thickness of the workpiece 37, and since it is advisable to hold the height of the space between the cutting edge 35a of the fixed blade 35 and the heads of the plungers 46a to a minimum, the just described arrangement insures that the plungers 46a must travel a short distance on their way into engagement with the upper side of the workpiece 37 and that the width of the space for the workpiece is adjusted automatically preliminary to insertion of a thicker or thinner workpiece. Furthermore, such construction of the improved shearing machine insures that a single manipulation (of the handle 43) is sufficient to change the angle α and to simultaneously change the strokes of the plungers 46a. Consequently, both such adjustments may be completed with little loss in time and the shearing machine may be rapidly and conveniently converted for cutting of different workpieces whose thicknesses e may vary within a wide range. In addition, the configuration of the cam face 52a is preferably selected in such a way that the operator is automatically prevented from introducing into the shearing machine a workpiece whose thickness e is not properly proportioned to the magnitude of the angle α. Thus, the width of the space for reception of the workpiece is only slightly more than the permissible thickness of the workpiece when the shearing angle α is selected for a given shearing operation and, consequently, even if a careless operator would wish to introduce a workpiece of excessive thickness (for such selected shearing angle), the workpiece cannot be fitted between the fixed blade 35 and the plungers 46a. Therefore, in addition to furnishing a very simple solution for reducing the length of strokes which the hold-down mechanism must perform in order to engage or to be disengaged from the workpiece, this mechanism embodies a safety feature which prevents the machine from receiving a workpiece of excessive thickness for a selected shearing angle.

For example, if the thickness e of a workpiece is 10 mm., the distance between the level of the lower cutting edge 35a and the heads at the lower ends of the plungers 46a will exceed only slightly 10 mm., and such distance will be set automatically once the rod 30 is axially adjusted to select a shearing angle α which is necessary for cutting of such workpieces. If the machine is converted for shearing of workpieces whose thickness e is 15 mm., the plungers 46a are lifted in a fully automatic way as soon as the rod 30 is moved by the handle 43 to a position in which the shearing angle α corresponds to that angle which is most satisfactory for cutting of workpieces having a thickness of 15 mm.

In order to insure that the upper cutting edge 36a will cross the cutting edge 35a of the lower blade 35 in raised position of the apron 1, the shearing machine comprises stop means for limiting the upward stroke of the piston rod 16a. This stop means is adjusted automatically in response to axial movements of the rod 30 and comprises a lever 79 which is pivotal about a horizontal pin 79b fixed to the frame 9. A spring 79c biases the lever 79 against a pin 30d provided on the rod 30, and the upper end portion or boss 79a of this lever is movable into abutment with a fixed stop 81 on the frame 9 when the rod 30 is shifted to the left, as viewed in FIG. 5. The stop 81 limits the extent to which the transmission including the link train 25, 27, 29, 33, 34 may delay the closing of the pilot valve 15 with respect to the closing of the valve 14.

When the piston rod 16a lifts the apron 1 and the blade 36 away from the blade 35, the lower arm of the lever 25 comes into abutment with the boss 79a and prevents further upward movement of the apron 1. By shifting the rod 30 in response to actuation of the handle 43, the operator may adjust the initial position of the boss 79a and hence the extent to which the cutting edges 35a, 36a cross each other. The end position of the boss 79a is shown in FIG. 6 in phantom lines, as at 79a', and the boss assumes such end position when the rod 30 is shifted all the way to the left whereby the pin 30d compels the lever 79 to pivot in an anticlockwise direction until it is arrested by the fixed stop 81. The upward stroke of the piston rod 16a is reduced to the exact length of the boss 79a when the boss 79a assumes the phantom-line position 79a'.

The cylinders 46b of the hold-down mechanism are connected in series (see FIG. 6) and receive pressure fluid through a supply conduit 62 whose intake end is connected to a valve housing 48 (see FIG. 7), and the latter receives pressure fluid through a supply conduit 63. The valve housing 48 is also connected with the intake end of the supply conduit 16f.

The valve housing 48 accommodates a reciprocable valve member 89a which is biased by a spring 89b and which may be shifted against the bias of this spring by a lever 85 pivotable about a pin 85a which is fixed to the frame 9, see FIG. 7. The free end of the lever 85 is operatively connected with the stud 1e of the apron 1, and this lever engages by friction a further lever 86 which is also pivotable about the pin 85a and which serves as a means for moving the valve member 89a against the bias of the spring 89b. The stroke of the lever 86 is limited by a pair of adjustable stops 87, 87a which are secured to the frame 9. The lever 86 is adapted to rock a bell crank lever 91 which carries a motion transmitting lug 90 having an inclined face located in the path of the free end of the lever 86. The bell crank lever 91 is pivotable about a pin 91a which is mounted in the frame 9. The lug 90 is pivotable about a pin 90a carried by the bell crank lever 91 and is biased by a spring 98 which tends to maintain it in abutment with a stop pin 90b on the bell crank lever 91.

The left-hand arm of the bell crank lever 91 (as viewed in FIG. 7) actuates a valve member 48b which extends into the valve housing 48 to control a ball valve 48a. When the valve member 48b is moved upwardly against the bias of a spring 48c (namely, when the lever 86 rocks the bell crank lever 91 in a clockwise direction, as viewed in FIG. 7, in response to downward movement of the stud 1e), the ball valve 48a prevents the flow of pressure fluid from the conduit 63 to the conduit 16f at a time when the piston rod 16a has completed a downward stroke of predetermined length. At the same time, the spring 89b is free to move a ball valve 89 into sealing position in which this valve prevents the flow of fluid from the valve housing 48 through a return conduit 48d and back to the tank T. Such closing of the valve 89 is due to the fact that, in response to downward movement of the stud 1e, the lever 86 pivots in an anticlockwise direction (as viewed in FIG. 7) and moves its adjustable projection 86a away from the valve member 89a so that the spring 89b is free to move the ball valve 89 against its seat in the housing 48 and to seal the intake end of the return conduit 48d from the supply conduit 63. The pressure of fluid in the housing 48 opens the ball valve 92 which is also biased by the spring 89b so that the valve 92 permits flow of pressure fluid from the conduit 63 to the conduit 62 and maintains the hold-down mechanism in operative position in which the plungers 46a bear against the upper side of the workpiece 37.

When the stud 1e is lifted, the lever 86 moves the valve member 89a upwardly so that pressure fluid can flow from the chambers of cylinders 46b, through the conduit 62, around the valve 89, through the right-hand portion of the valve housing 48, through the return conduit 48d, and back to the tank T.

While the plungers 46a bear against the workpiece 37, the pressure of fluid in the cylinders 46b rises and the fluid opens a relief valve 88 in the housing 48; this valve is adjustable so that the fluid pressure in the cylinders 46b of the hold-down mechanism may be varied within a desired range. When the valve 88 opens, it permits flow of pressure fluid from the supply conduit 63, through the left-hand portion of the valve housing 48, and into the supply conduit 16f even if the valve 48a is in sealing position so that the piston rod 16a begins anew to move the apron 1 and the blade 36 toward the cutting edge 35a. As the apron descends, its stud 1e again pivots the levers 85, 86 whereby the lever 86 passes beyond the lug 91 which was rocked by this lever against the stop pin 90b so that the spring 48c returns the valve member 48b to its lower end position and permits direct flow of pressure fluid from the conduit 63 to the conduit 16f, that is, the fluid need not pass around the relief valve 88. At the same time, the valve 92 maintains the fluid pressure in the cylinders 46b at a desired value which is sufficient to properly hold the workpiece 37 during the shearing operation.

The provision of valves in the housing 48 and of the parts 85, 86, 90, 91 enables an operator to adjust the pressure of fluid in the hold-down mechanism by adjusting the valve 88 and/or by adjusting the position of the projection 86a so that the fluid is not subjected to excessive heating.

When the apron 1 is raised, the spring 98 yields in response to clockwise displacement of the lever 86 (which is entrained by the stud 1e and by the lever 85) so that the lever 86 returns to the full-line position of FIG. 7 and opens the valve 89 by simultaneously closing the valve 92 whereby the pressure fluid may flow from the conduit 62 to the conduit 48d and back to the tank T in response to upward movement of the plungers 46a which are permanently biased against the cam face 52a by suitable springs 46e one of which is shown in FIG. 6.

By limiting the strokes of the plungers 46a, the shearing machine of my invention may be operated at more frequent intervals because it requires very little time to lift or to lower the hold-down mechanism. Furthermore, the machine produces less noise and, since the pressure of fluid in the cylinders 46b may be adjusted by the valve 88, it is possible to avoid any markings on the upper side of the workpiece 37. Such markings would be due to imprints made by the heads of the plungers 46a if the plungers were subjected to excessive fluid pressure. If desired, the valve 88 may be adjusted by the handle 43 so that a single handle may be used to perform a series of adjusting operations including adjusting the height of the space for the workpiece, adjusting the inclination of the cutting edge 36a, adjusting the pressure of the hold-down mechanism, adjusting the downward strokes of the piston rods 16a, 17a, and limiting the upward stroke of the piston rod 16a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A shearing machine comprising a frame; a first blade fixed to said frame and having an elongated cutting edge; a second blade having a pair of spaced end portions and comprising an elongated cutting edge substantially parallel with the cutting edge of said first blade, said second blade being movable toward and away from said fixed blade so that, when said second blade moves toward the fixed blade, said cutting edges form a cut in a workpiece which is placed between said blades whereby the workpiece generates a reaction force which tends to move the second blade laterally of and away from said first blade, a support reciprocably received in said frame and having a retaining portion rigid with and closely adjacent to the cutting edge of said second blade; means for moving said support and said second blade toward said first blade, said moving means comprising a pair of hydraulic jacks each mounted in said frame, each operatively connected with said support, and each adapted to apply a shearing force to one end portion of said second blade, and separate fluid pressure generating means for said jacks so that the shearing force which is applied to the second blade by one of said jacks in response to fluid pressure generated by the respective pressure generating means may be added to the shearing force which is applied by the other jack; holding means mounted in said frame for resisting the reaction force which acts upon said second blade, said holding means comprising a plurality of holding members engaging said retaining portion of the support in close proximity of the cutting edge of said second blade and resilient means for biasing said support against said holding members, said resilient means operating between said support and said frame.

2. A shearing machine as set forth in claim 1, wherein said holding members are presser rollers, and further comprising adjusting means for moving said presser rollers with respect to said retaining portion.

3. A shearing machine as set forth in claim 2, wherein said adjusting means comprises lever means pivoted to said frame, said lever means having first and second arm means one of which is connected with said presser rollers, and turnable cam means supported by said frame and engaging the other arm means of said lever means to pivot said lever means and to thereby move said presser rollers with respect to said retaining portion.

4. A shearing machine as set forth in claim 3, wherein said adjusting means further comprises a cam shaft rigid with said cam means and turnably mounted in said frame.

5. A shearing machine comprising a frame including a two-faced frame member; a first elongated blade fixed to said frame; a second elongated blade having a pair of spaced end portions; a support rigidly fixed to said second blade and reciprocable in said frame to move said second blade toward and away from said first blade; guide means on said frame for guiding the support during such reciprocatory movements toward and away from said first blade said guide means comprising roller means mounted on said support and engaging the opposite faces of said frame member; and means for moving said support toward said first blade, said moving means comprising a pair of hydraulic jacks each connected with said support and each adapted to apply a shearing force to one end portion of said second blade, and separate fluid pressure generating means for said jacks so that the shearing force which is applied to the second blade by one of said jacks in response to fluid pressure generated by the respective pressure generating means may be added to the shearing force which is applied by the other jack.

6. A shearing machine as set forth in claim 5, wherein said guide means further comprises a pair of rails rigid with said frame and substantially perpendicular to the longitudinal extension of said first blade, and rollers mounted on said support and engaging said rails.

7. A shearing machine comprising a fixed blade; an elongated second blade having two spaced end portions and being movable toward and away from said fixed blade; and means for moving said second blade toward said fixed blade, said moving means comprising a pair of hydraulic jacks each operatively connected with and adapted to apply a shearing force to one end portion of said second blade, separate fluid pressure generating means for said jacks so that the shearing force which is applied to the second blade by one of said jacks in response to fluid pressure generated by the respective pressure generating means may be added to the shearing force which is applied to the second blade by the other jack, supply conduit means connecting said jacks with the respective pressure generating means, return conduit means for conveying fluid from said jacks, a pair of pilot valve means each movable between an open and a closed position for regulating the flow of fluid between said supply conduit means and the respective return conduit means, control means connected to one of said valve means for moving only said one valve means between said open and closed positions, and an operative connection between said pair of pilot valve means for moving the other of said valve means in response to movement of said one valve means.

8. A shearing machine comprising a fixed blade; an elongated second blade having two spaced end portions and being movable toward and away from said fixed blade; and means for moving said second blade toward said fixed blade, said moving means comprising a pair of hydraulic jacks each operatively connected with and adapted to apply a shearing force to one end portion of said second blade, separate fluid pressure generating means for said jacks so that the shearing force which is applied to the second blade by one of said jacks in response to fluid pressure generated by the respective pressure generating means may be added to the shearing force which is applied to the second blade by the other jack, supply conduit means connecting said jacks with the respective pressure generating means, return conduit means for conveying fluid from said jacks, each of said jacks comprising pilot valve means movable between an open and a closed position for regulating the flow of fluid between said supply conduit means, and the respective return conduit means, an operative connection between said pair of pilot valve means for moving one of said valve means in response to movement of the other valve means, said operative connection comprising an adjustable transmission and further comprising means for adjusting said transmission so that movement of said one pilot valve may be delayed with respect to the movement of said other pilot valve.

9. A shearing machine as set forth in claim 8, further comprising stop means for limiting the extent of adjustment of said transmission.

10. A shearing machine comprising a fixed blade; an elongated second blade having a first and a spaced second end portion and being movable toward and away from said fixed blade so that a cut is formed in a workpiece which is placed between said blades when the second blade moves toward said fixed blade; means for moving said second blade toward said fixed blade, said moving means comprising a first and a second hydraulic jack each operatively connected with and adapted to apply a shearing force to the respective end portion of said second blade, and separate fluid pressure generating means for said jacks so that the shearing force which is applied to the second blade by said first jack in response to fluid pressure generated by the respective pressure generating means may be added to the shearing force which is applied by said second jack; and a hold-down mechanism for engaging the workpiece during a shearing cycle, said mechanism comprising a plurality of work-engaging hydraulic rams, conduit means connecting said rams with one of said pressure generating means, valve means in said conduit means, and an operative connection between said second blade and said valve means for actuating said valve means in response to movement of said second blade.

11. A shearing machine as set forth in claim 10, wherein each of said rams comprises a plunger reciprocable in directions toward and away from said fixed blade and further comprising adjustable cam means for limiting the strokes of said plungers in directions away from said fixed blade.

12. A shearing machine as set forth in claim 11, wherein said second blade is inclined with respect to said fixed blade and further comprising adjusting means for changing the inclination of said second blade.

13. A shearing machine as set forth in claim 12, further comprising an operative connection between said cam means and said adjusting means so that the cam means is adjustable simultaneously with the inclination of said second blade.

14. A shearing machine as set forth in claim 12, wherein said adjusting means comprises manually operated handle means.

15. A shearing machine comprising a fixed blade; an elongated second blade having two spaced end portions and being movable toward and away from said fixed blade; and means for moving said second blade toward said fixed blade, said moving means comprising a pair of hydraulic jacks each operatively connected with and adapted to apply a shearing force to one end portion of said second blade, separate fluid pressure generating means for said jacks so that the shearing force which is applied to the second blade by one of said jacks in response to fluid pressure generated by the respective pressure generating means may be added to the shearing force which is applied to the second blade by the other jack, supply conduit means connecting said jacks with the respective pressure generating means, return conduit means for conveying fluid from said jacks, a pair of pilot valve means each movable between an open and a closed position for regulating the flow of fluid between said supply conduit means and the respective return conduit means, an operative connection between said pair of pilot valve means for moving one of said valve means in response to movement of the other valve means, said operative connection comprising an adjustable transmission and further comprising means for adjusting said transmission so that movement of said one pilot valve may be delayed with respect to the movement of said other pilot valve.

References Cited by the Examiner
UNITED STATES PATENTS

| | | | |
|---|---|---|---|
| 484,370 | 10/1892 | Horner | 83—644 X |
| 729,430 | 5/1903 | Shem | 83—639 X |
| 1,334,718 | 3/1920 | Slick | 83—639 X |
| 2,278,713 | 4/1942 | Riddle | 83—639 X |
| 2,312,213 | 2/1943 | Ferris | 83—639 X |
| 2,645,287 | 7/1953 | Munschauer | 83—640 X |
| 2,781,844 | 2/1957 | Pearson et al. | 83—639 X |
| 2,970,505 | 2/1961 | Geenen | 83—639 X |
| 3,054,317 | 9/1962 | Castle | 83—639 X |
| 3,081,659 | 3/1963 | Theobald | 100—53 X |
| 3,100,414 | 8/1963 | Watkins et al. | 83—632 X |
| 3,183,575 | 5/1965 | Skeel | 83—582 X |

FOREIGN PATENTS

| | | |
|---|---|---|
| 57,236 | 2/1940 | Denmark. |
| 608,306 | 4/1926 | France. |

WILLIAM W. DYER, JR., *Primary Examiner.*

ANDREW R. JUHASZ, *Examiner.*

J. M. MEISTER, *Assistant Examiner.*